(12) United States Patent
Groenendijk et al.

(10) Patent No.: US 6,623,225 B1
(45) Date of Patent: Sep. 23, 2003

(54) EXPANDABLE BOLT AND USE FOR FRAGILE PARTS

(75) Inventors: Anthonie W. Groenendijk, Naarden (NL); Christianus Gerardus Maria de Ridder, Hoogland (NL)

(73) Assignee: ASM International N.V., Bilthoven (NL)

( * ) Notice: Subject to any disclaimer, the term of this patent is extended or adjusted under 35 U.S.C. 154(b) by 0 days.

(21) Appl. No.: 10/127,059

(22) Filed: Apr. 19, 2002

(51) Int. Cl.$^7$ ................................................ F16B 13/06
(52) U.S. Cl. ........................ 411/60.3; 411/21; 411/55; 411/64
(58) Field of Search ................ 411/2.1, 60.2, 411/60.3, 55, 63, 64, 65, 66

(56) References Cited

U.S. PATENT DOCUMENTS

| | | | | |
|---|---|---|---|---|
| 3,312,138 A | * | 4/1967 | Cumming | 411/21 |
| 3,942,407 A | | 3/1976 | Mortensen | |
| 4,402,639 A | * | 9/1983 | Kessler | 411/65 X |
| 4,983,082 A | * | 1/1991 | Mark | 411/60.3 |
| 5,284,409 A | * | 2/1994 | Miyanaga | 411/65 X |
| 5,288,190 A | * | 2/1994 | Winkeljann et al. | 411/60.2 X |
| 5,772,372 A | * | 6/1998 | Lins et al. | 411/60.2 X |

* cited by examiner

*Primary Examiner*—Neill Wilson
(74) *Attorney, Agent, or Firm*—Knobbe, Martens, Olson & Bear, LLP

(57) ABSTRACT

An expandable bolt device secures a fragile part, like a quartz part, onto a second part. The expandable bolt device comprises a bolt and a locking device near a distal end of the bolt, the locking device being movable radially between an outward locked position and an inward unlocked position by moving the bolt axially with respect to the locking element. The distal end of the bolt is accommodated within a hole in a surface of the fragile part, which hole includes a first cylindrical section adjacent the surface and a wider second cylindrical section that is further away from the surface. In the unlocked position, the diameter of the expandable bolt device is smaller than the first diameter. After insertion of the expandable bolt device into the hole, the locking element is located in the second section of the hole. In the locked position, the locking element expands to a diameter wider than the first hole section and narrower than the second hole section.

29 Claims, 5 Drawing Sheets

EXPANDABLE BOLT AND USE FOR FRAGILE PARTS

FIELD OF THE INVENTION

The invention relates generally to methods and structures for joining a first part onto a second part. In particular, the invention relates to an expandable bolt device for joining a fragile part to a second part.

BACKGROUND OF THE INVENTION

Expandable bolt devices are known from prior art, using screws or bolts and nuts. U.S. Pat. No. 3,942,407 describes a screw anchoring device adapted to be inserted in a bored hole and of the type having a tubular anchoring member molded from plastics material and provided with longitudinally extending slits or slots. The anchoring member co-operates with a screw in such a manner that the anchoring member may be axially compressed and thereby radial expanded by tightening of the screw.

Using an expandable bolt device joining a fragile part, such as a ceramic part, onto a second part, such as a steel part, entails specific problems relating to the fragility of the ceramic part and consequent risk of breakage.

A first problem relates to the forces that act upon such fragile parts. The forces that act upon a fragile part as a consequence of joining with another part could result in exceeding material property limits of the fragile part, leading to its destruction. Particularly when the expandable bolt device is mounted in a hole in the fragile part, the radial forces exerted by the expanded bolt upon the fragile part can result in damage. This is particularly a problem when the joined parts are subjected to repeated thermal cycling. Due to differences in thermal expansion of the different materials used, the forces upon the fragile part can become excessive. To prevent destruction of the fragile part it is necessary to minimize the forces acting upon the fragile part, in other words to ensure that the forces exerted upon the fragile part never exceed the maximum allowable forces for the fragile part.

A second problem relating to differences in thermal expansion is that, when the joined parts are subjected to thermal cycling, play can develop in the joint so that the joint loosens and allows the parts to move with respect to each other, which is undesirable.

It is accordingly an object of the invention to provide an expandable bolt device that can be used to mount a fragile part securely onto a second part with minimal risk of damaging fragile part. It is a further object of the invention to provide an expandable bolt device that can be used for a vertical furnace, to mount a quartz inner doorplate to a stainless steel outer doorplate.

SUMMARY OF THE INVENTION

Embodiments of the present invention provide an expandable bolt device, co-acting with a hole in a surface of a fragile part such that the expandable bolt device exerts minimal and preferably no radial forces upon the fragile part.

According to one aspect of the invention, a surface of the fragile part is provided with a hole, the hole comprising a first section near a surface and a second section farther from the surface. The first section has a first width and the second section has a second width that is larger than the first width. An expandable bolt device is provided with an expandable section at one end. The expandable bolt fits in the hole such that the expandable section is located in the second section of the hole. In the illustrated embodiment, the expandable section is radially expandable from a width smaller than the first width to a width larger than the first width but smaller than the second width.

According to a further aspect of the invention, an expandable bolt device joins a part with a second part. The expandable bolt device is inserted with an expanable end into a hole in the fragile part. At an opposing end, the bolt device is mounted through a hole in the second part. In the illustrated embodiments, the bolt device is provided with springs that exert a gentle force on the expandable bolt device such that the fragile part is pulled against a bearing surface.

In accordance with another aspect of the invention, a method is provided for mounting a fragile part to a second part. The method includes providing a cylindrical hole in a surface of the fragile part. The hole has a first section adjacent to the surface, and a second section located further away from the surface. The first section having a first width and the second section having a second width larger than the first width. The method further includes providing an expandable bolt device with a shaft and a radially movable locking element proximate a distal end of the shaft. The distal end of the expandable bolt device is inserted into the hole. Axially moving the shaft with respect to the locking element causes outward radial movement of the locking element within the second section of the hole.

DETAILED DESCRIPTION OF THE PREFERRED EMBODIMENTS

Figure 1A:
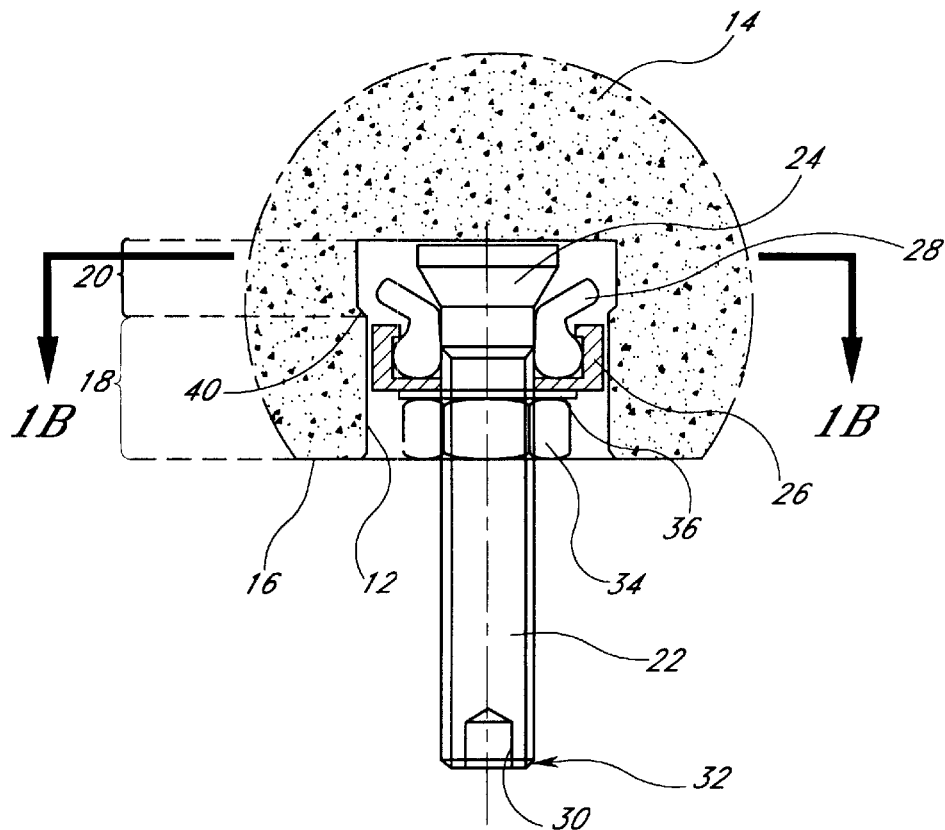
FIG. 1A is a cross-sectional side view of a fragile part and expandable bolt shown in an unlocked position, in accordance with a preferred embodiment of the present invention.
Figure 1B:
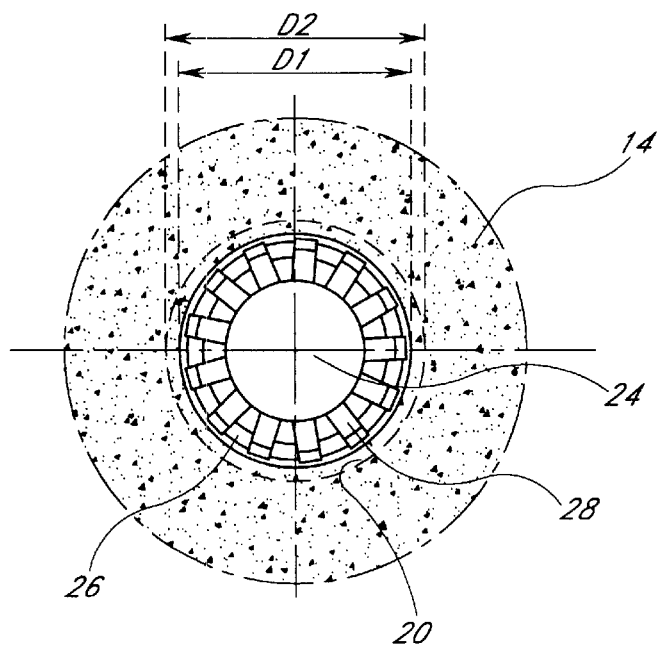
FIG. 1B is a top down section taken along lines 1B—1B of FIG. 1A.

In FIG. 1A an expandable bolt device 10 according to the preferred embodiments of the present invention is shown at an early stage of assembly. A top view of the expandable bolt device 10 is indicated in FIG. 1B. The expandable bolt device 10 comprises a threaded bolt 22 and a locking device near one end of the bolt 22. As will be appreciated by the skilled artisan, the expandable bolt device can take any of a number of forms. For example, several designs for expandable screw anchoring devices are disclosed in U.S. Pat. No. 3,942,407, the disclosure of which is incorporated herein by reference. Preferably, however, rather than merely relying on compression and consequent radial expansion of a pliable material, the expandable bolt device 10 of the preferred embodiment has a particularly advantageous design for avoiding undue stresses on a fragile part.

FIGS. 1A and 1B show the expandable bolt device 10 inserted into a hole 12 of a fragile part 14. The hole 12 extends from a surface 16 of the fragile part 14, and includes a first cylindrical hole section 18 adjacent to the surface 16 and having a first diameter D1. A second cylindrical section 20 of the hole 12 is coaxial with the first section 18 and located further away from the fragile part surface 16. The second cylindrical section 20 has a diameter D2 that is larger than the first diameter D1. In the unlocked position illustrated in FIGS. 1A and 1B, the diameter of the expandable bolt device 10 is smaller than the first diameter D1 and, naturally, smaller than the second diameter D2.

The expandable bolt device 10 includes a threaded bolt 22 that includes a distal end 24 with a diameter larger than the threaded part of the bolt 22. For example, the illustrated distal end 24 has a conical shape that flares outwardly from the threaded part of the bolt 22. In other arrangements, the distal end can have a spherical or other bulbous shape.

The expandable bolt device 10 also includes a retainer ring 26 that has a generally C-shaped cross section in the illustrated embodiment. The retainer ring 26 annularly surrounds the threaded bolt 22 and traps a locking device between the retainer ring 26 and the threaded bolt 22. The preferred locking device comprises a plurality of locking elements 28 which are radially movable between an inward unlocked position (see FIG. 1) and an outward locking position (see FIG. 2) by moving the bolt 22 in an axial direction with respect to the locking elements 28. In particular, the locking elements 28 each include an inner portion, which is trapped against the bolt 22 by the retainer ring 26, and an outer portion protruding out of the retainer ring 26. The locking elements 28 are configured to pivot outwardly when urged against the flared bolt end 24 by the axial movement. The illustrated threaded bolt 22 also includes a blind hole 30 sized and shaped to receive an Allen key at a second or proximal end 32. A nut 34 is threaded up the threaded bolt 22 to the retainer ring 26, except for the presence of an intervening washer 36.

In operation, the bulbous distal end 24 of the threaded bolt 22 is inserted into the hole 12 in the fragile part 14, such that the locking elements 28 at least partially extend into the second section 20 of the hole 12. In the unlocked position of FIG. 1, the locking elements 28 define a width or diameter more narrow than the narrowest section. 18 of the hole 12. The nut 34 is then tightened about the threaded bolt 22, such as by fixing the nut 34 and turning an Allen key in the receiving hole 30 at the proximal end 32 of the bolt 22, or vice versa. As will be appreciated, tightening of the nut 34 causes relative axial movement of the bolt 22 and the locking elements 28, causing the locking elements 28 to engage with the flared flange of the distal end 24 of the threaded bolt 22. The shape of the locking elements 28 is such that continued pressure forces the locking elements 28 to move radially outwardly to a width or diameter larger than the first diameter D1. In particular, the outer portion of the locking elements 28 are urged outwardly by engagement of the inner portion of the locking elements with the flared distal end 24 of the bolt 22, which urges the locking elements 28 to pivot within the retainer ring.

Figure 2A:
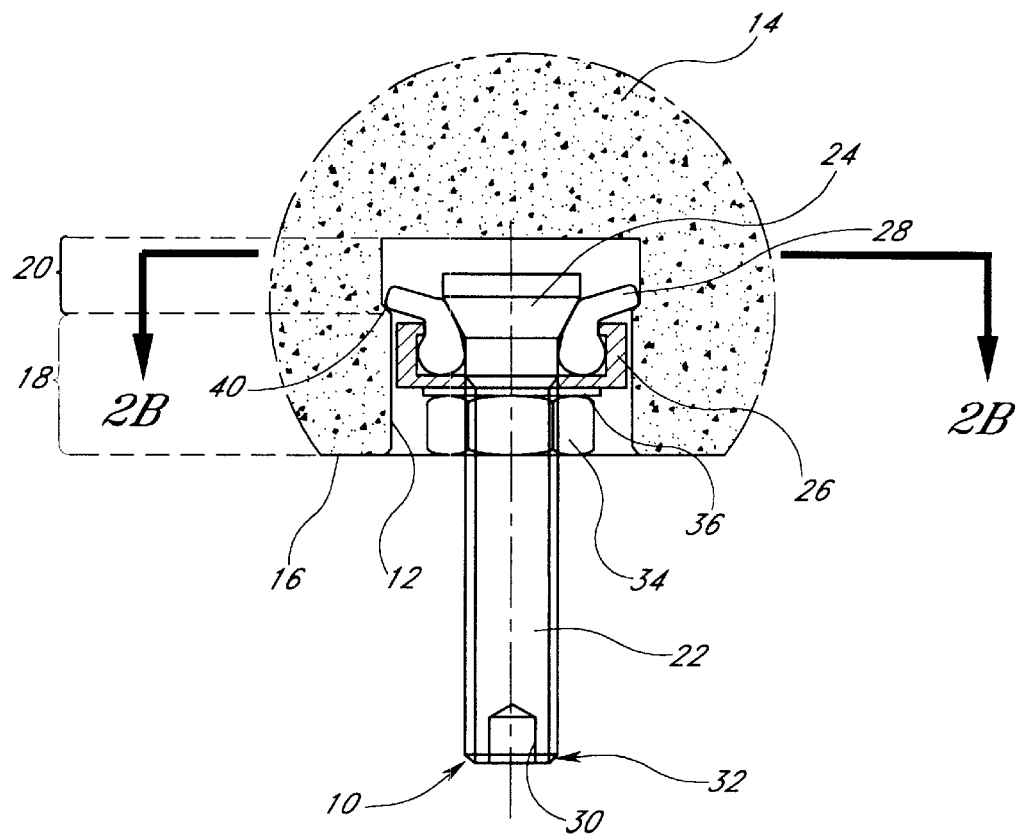
FIG. 2A is a cross-sectional side view of the fragile part and expandable bolt device of FIG. 1A, shown in a locked position.
Figure 2B:
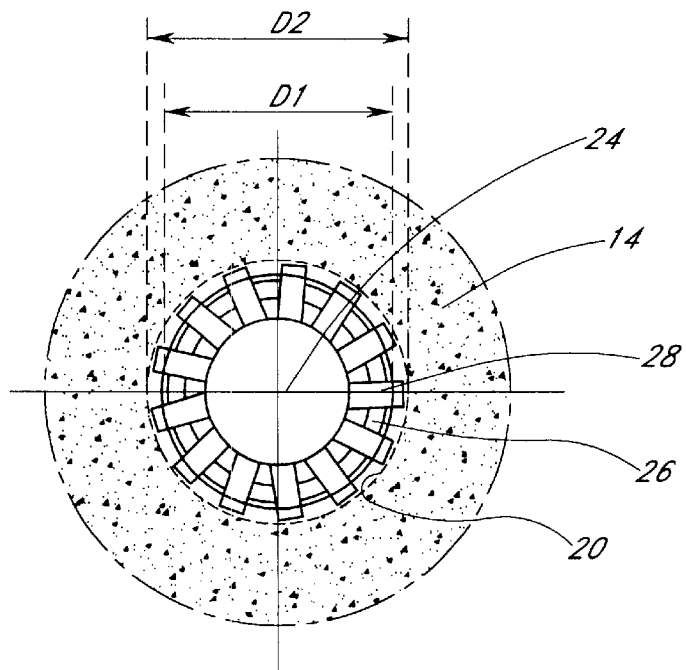
FIG. 2B is a top down section taken along lines 2B—2B of FIG. 2A.

Referring now to FIGS. 2A and 2B, the expandable bolt device 10 is shown in a locked position. Preferably, continued tightening of the nut 34 has caused the locking elements 28 to expand until such point as outer portions of the locking elements 28 engage with a distal surface of the retainer ring 26. The retainer ring 26 thereby limits the outward movement of the locking elements 28. Preferably, the retainer ring 26 and the locking elements 28 are configured such that the limitation on radial expansion prevents the locking elements 28 from exerting excessive force on the fragile part 14. Thus, the retainer ring 26 preferably limits the movement of the locking elements 28 to an outermost width or diameter that is smaller than the second diameter D2 of the second hole section 20 in the fragile part 14. The locking elements 28 preferably do not exert radial pressure upon the sidewalls of the second section 20 due to this limitation. In the illustrated arrangement, the locking elements 28 engage a flange 40 that transitions between the first section 18 and the second section 20 of the hole 12. As will be better understood from the description of FIGS. 3 and 4 below, engagement between the locking elements 28 and the flange 40 is facilitated by spring(s).

Preferably, as noted, the locking elements 28 expand to a width larger than the narrow proximal section 18, but smaller than the wider distal section 20 of the hole 12 in the fragile part 14.

Figure 3A:
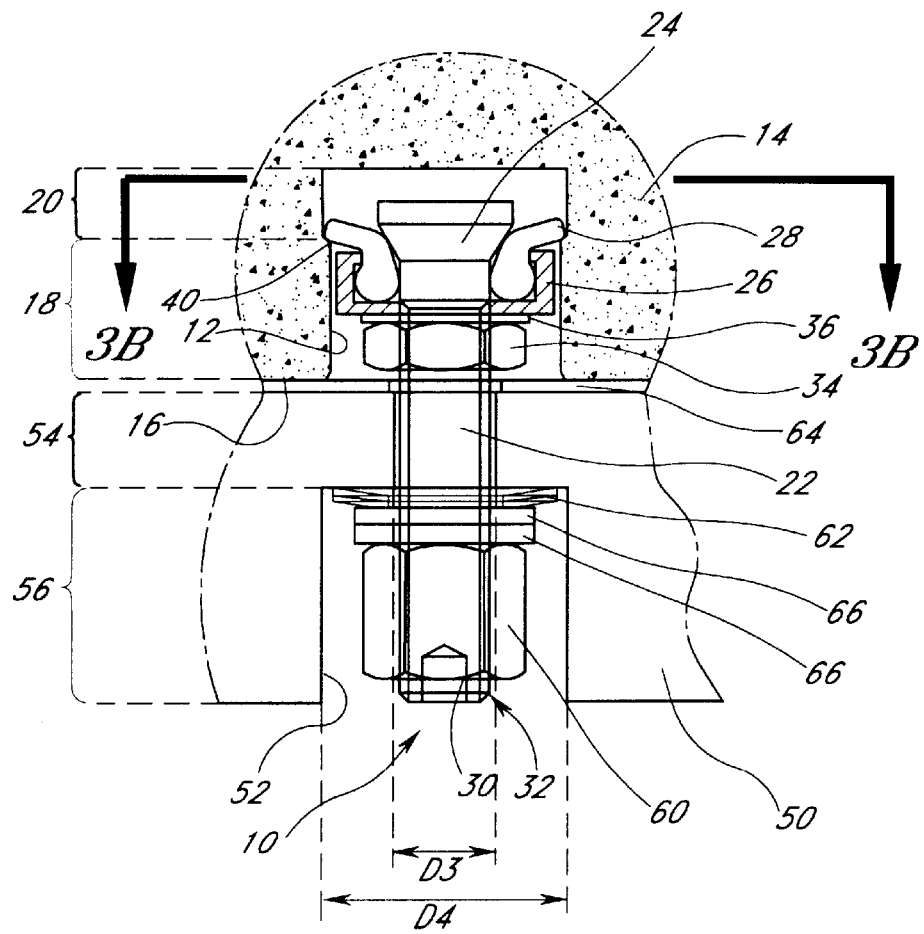
FIG. 3A is a cross-sectional side view of the expandable bolt device of FIG. 2A joining the fragile part to a second part.
Figure 3B:
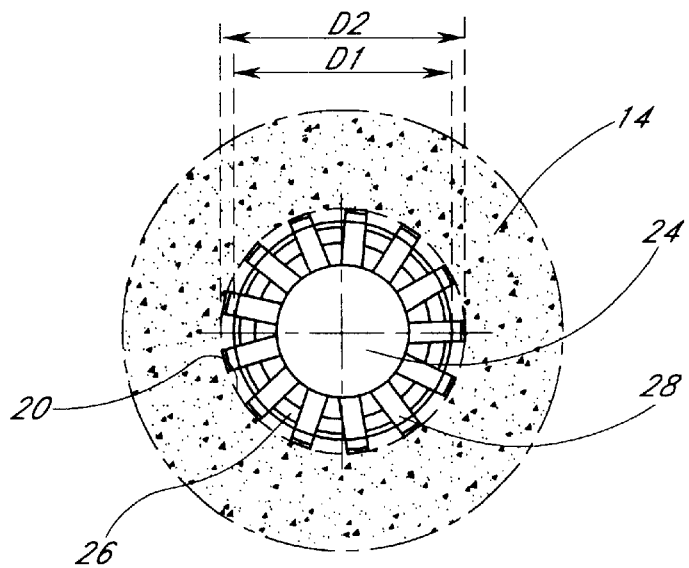
FIG. 3B is a top down section taken along lines 3B—3B of FIG. 3A.

Referring now to FIGS. 3A and 3B, the second or proximal end 32 of the bolt 22 can then be inserted into a second part 50. The illustrated second part 50 also includes a hole 52 that includes two sections: a first section 54 located adjacent the fragile part 14 and having a first width or diameter D3 and a second section 56, which is located further away from the fragile part 14 and has a second width or diameter D4 that is larger than the first diameter D3. The second diameter D4 is large enough to accommodate a nut 60 used to secure the expandable bolt device 10 to the second part 50 by the rotation of the nut 60 around the threaded bolt 22. As noted, the second end 32 of the bolt 22 is provided with a blind hole 30 configured to receive an Allen key to facilitate tightening the nut 60 over the threaded bolt 22.

The second end 32 of the bolt 22 is preferably provided with at least one spring 62 between the nut 60 and a proximal surface of the second part 50. The spring(s) 62 exert a gentle force on the expandable bolt device 10 out of the hole 12. Engagement of the locking elements 28 with the flange 40 prevents removal of the expandable bolt device, such that the springs 62 pull the fragile part 14 against a bearing provided by a shim 64, partly shown in FIG. 3. At least one washer 66 (two shown) is provided between the springs 62 and the nut 60.

Figure 4A:
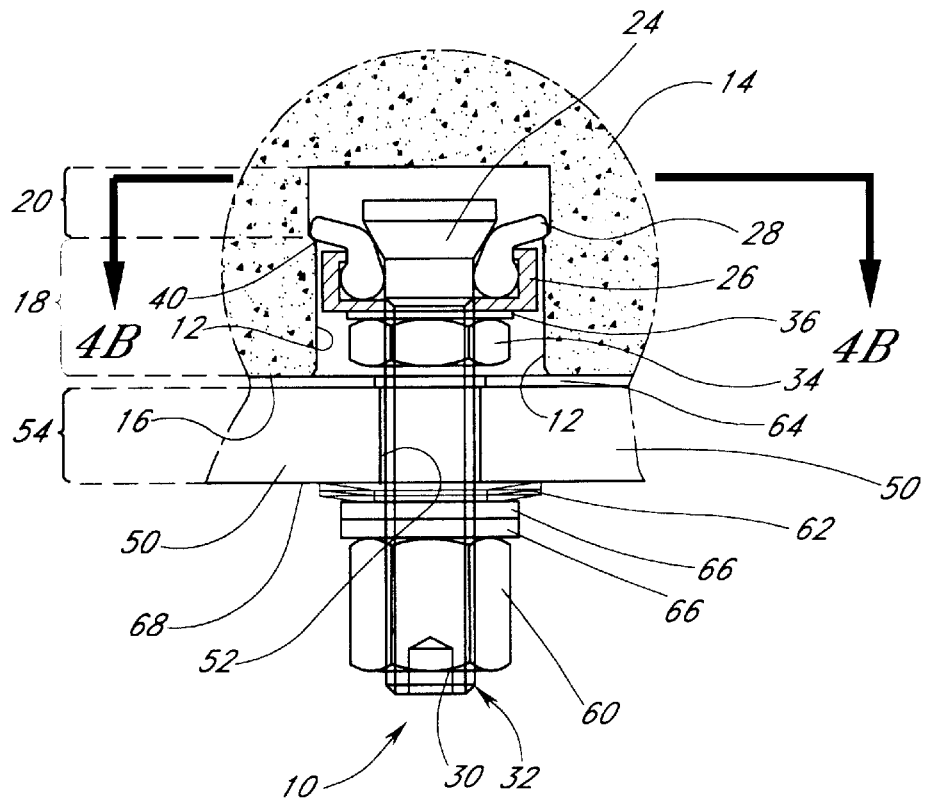
FIG. 4A is a cross-sectional side view showing the expandable bolt device of FIG. 2A joining the fragile part to a different second part, in accordance with another embodiment of the invention.
Figure 4B:
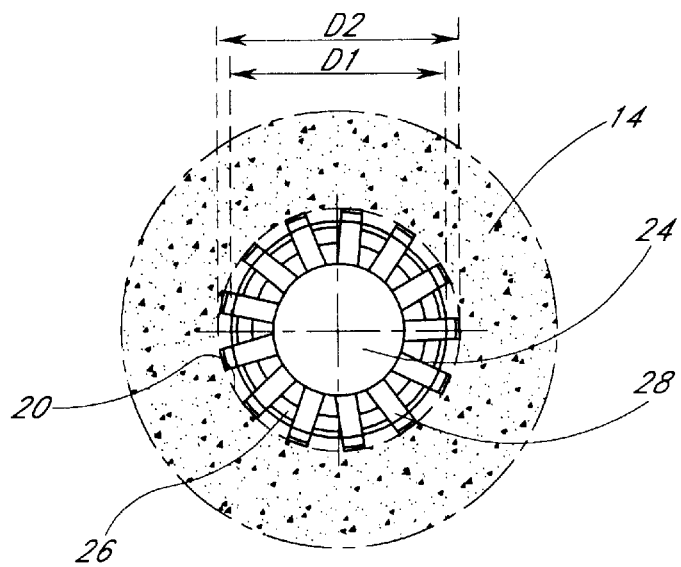
FIG. 4B is a top down section taken along lines 4B—4B of FIG. 4A.

Referring now to FIGS. 4A and 4B, the expandable bolt device 10 is shown joining a fragile part 14 to a different second part 50, in accordance with another embodiment of the present invention. Like reference numbers are used to refer to similar parts to those of the previously described embodiment. In the illustrated embodiment of FIG. 4, the second part 50 comprises a hole 52 with only one section 54 having a diameter large enough to accommodate the shaft of the threaded bolt 22. The nut 60, springs 62 and washers 66 rest on the outer surface 68 of the second part 50.

In the above-described embodiments of FIGS. 3 and 4, the expandable bolt device 10 is particularly advantageous in joining a ceramic part, such as a quartz part, to a stronger second part, such as a steel part. The fragile part 14 of the illustrated embodiments, in such an arrangement, is ceramic, and is provided with a hole having a first section with a first diameter D1 near the ceramic part surface 16, and a second section with a second diameter D2 distal from the surface 16. The second diameter D2 is larger than the first diameter D1.

Figure 5:
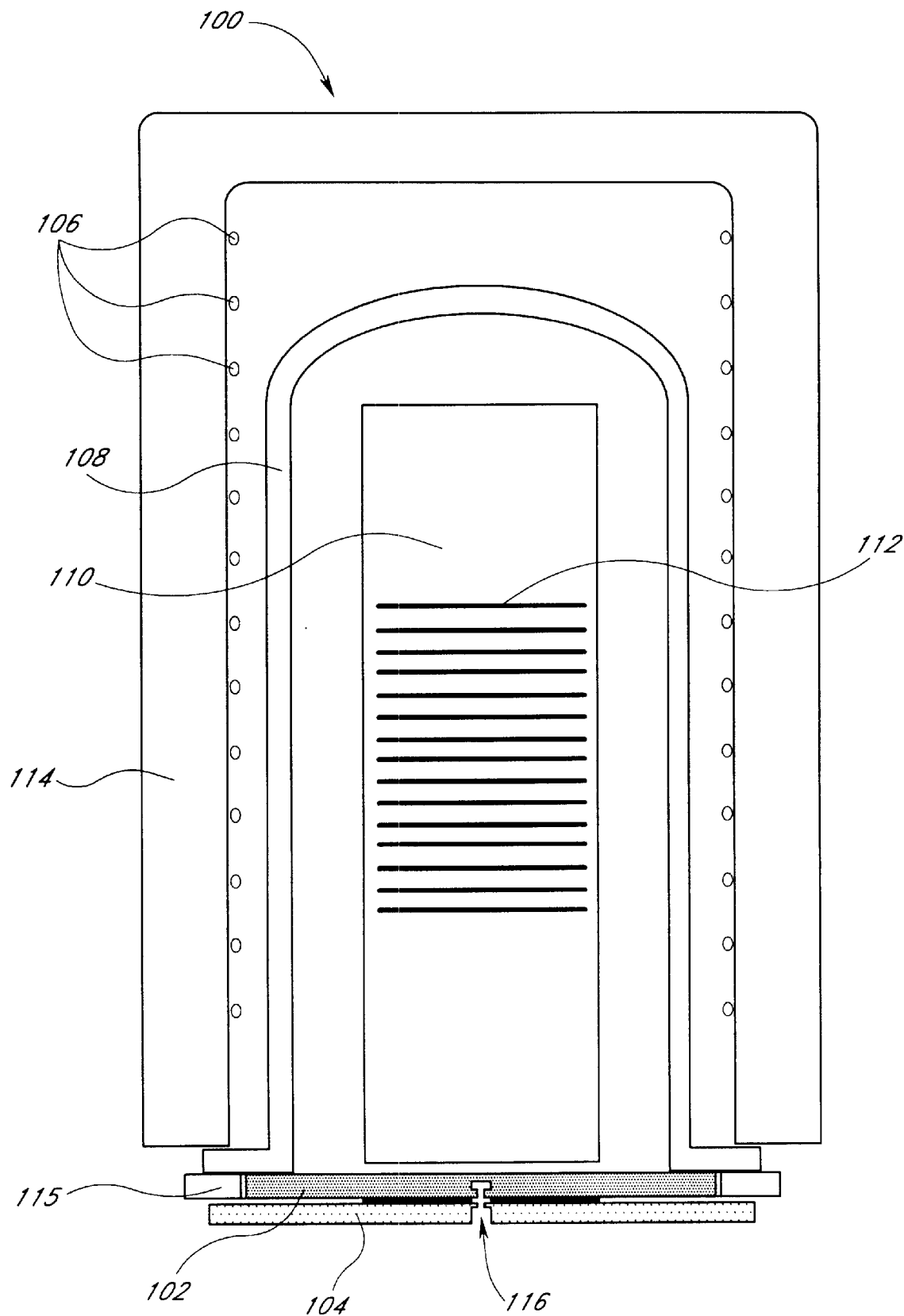
FIG. 5 is a schematic cross-sectional side view of a vertical furnace, where an expandable bolt device is used to mount a quartz inner doorplate to a stainless steel outer doorplate, in accordance with a particular embodiment of the invention.

Referring now to FIG. 5, the expandable bolt device 10 as described hereinabove can advantageously be used in a vertical furnace 100. At least one expandable bolt device can be used to join a quartz inner doorplate 102 to a stainless steel outer plate 104. The vertical furnace 100 includes: a heater 106, such as a heating coil; a tube 108, such as a quartz tube, to delimit the process area; a wafer boat 110, such as a quartz boat, holding a plurality of wafers 112; conduits, not shown in FIG. 5, to supply and remove reactants from said process area; and a furnace wall 114 to isolate the heater 106 from the surroundings. The stainless steel outer doorplate 104, the quartz inner doorplate 102 and a surrounding flange 115 support the process tube 108 and wafer boat 110.

The quartz doorplate 102 is provided with at least one hole in a lower surface thereof. The hole in the quartz inner doorplate 102 is preferably a blind hole to prevent contact of process gases with the stainless steel plate 104. An expandable bolt 10 (FIGS. 1–4) in the circled portion 116 allows use of metal parts without damaging the quartz doorplate 102. Therefore, the expandable bolt 10 is heat resistant and can easily survive conditions to which it is subjected when the furnace 100 is heated to temperatures as high as 1000° C. to 1400° C.

Although this invention has been described in terms of certain preferred embodiments, other embodiments that are apparent to those of ordinary skill in the art are also within the scope of this invention. It will be appreciated by those skilled in the art that various modifications and changes may be made without departing from the scope of the invention. Such modifications and changes are intended to fall within the scope of the invention, as defined by the appended claims.

We claim:

1. An apparatus, comprising:
    a fragile part having a hole formed in a surface thereof, the hole comprising a proximal hole section adjacent to the surface and having a first width, and a distal hole section coaxial with the proximal section and located further away from the surface, the distal section having a second width larger than the first width; and
    an expandable bolt device inserted into the hole, the expandable bolt device comprising a bolt and a locking device near a distal end of the bolt, the locking device being radially movable between an outer locked position and an inner unlocked position by moving the bolt in an axial direction with respect to the locking device such that in the unlocked position a width of the locking device is smaller than the first width and in the locked position the width of the locking device within the distal hole is greater than the first width and is less than the second width, wherein the expandable bolt device further comprises a retainer ring adjacent to the locking device, wherein movement of the locking device is delimited by the retainer ring such that radial outward movement of the locking device is delimited to a locked position width smaller than the second width.

2. The apparatus of claim 1, wherein the locking device comprises a plurality of locking elements, divided in a spaced apart relationship around the circumference of the bolt.

3. The apparatus of claim 2, wherein the bolt comprises a flared head at the distal end, the locking elements configured to pivot outwardly when axial movement of the bolt urges the locking elements against the flared head.

4. The apparatus of claim 1, wherein axial movement of the bolt with respect to the locking device is brought about by the rotation of a nut around a threaded portion of the bolt.

5. The apparatus of claim 1, wherein the hole in the fragile part is a blind hole.

6. The apparatus of claim 1, further comprising a second part fixed adjacent the surface of the fragile part at least partially via the expandable bolt device.

7. The apparatus of claim 6, wherein the second part is formed of steel.

8. The apparatus of claim 6, wherein a proximal end of the bolt, opposite to the distal end, is mounted through a hole in the second part.

9. The apparatus of claim 1, wherein the hole in the fragile part is cylindrical.

10. An apparatus, comprising:
    a fragile part having a hole formed in a surface thereof, the hole comprising a proximal hole section adjacent to the surface and having a first width, and a distal hole section coaxial with the proximal section and located further away from the surface, the distal section having a second width larger than the first width;
    an expandable bolt device inserted into the hole, the expandable bolt device comprising a bolt and a locking device near a distal end of the bolt, the locking device being radially movable between an outer locked position and an inner unlocked position by moving the bolt in an axial direction with respect to the locking device such that in the unlocked position a width of the locking device is smaller than the first width and in the locked position the width of the locking device within the distal hole is greater than the first width and is less than the second width; and
    a second part fixed adjacent the surface of the fragile part at least partially via the expandable bolt device, wherein a proximal end of the bolt, opposite to the distal end, is mounted through a hole in the second part and the expandable bolt device is secured to the second part with a second nut and at least one spring near the proximal end of the bolt.

11. The apparatus of claim 10, wherein the hole through the second part comprises a first hole section, located adjacent the surface of the fragile part, and a second hole section, located further away from the surface of the fragile part, the first section having a third width, the second section having a fourth width larger than the third width and large enough to accommodate the at least one spring and the second nut.

12. An apparatus, comprising:
    a fragile part having a hole formed in a surface thereof, the hole comprising a proximal hole section adjacent to the surface and having a first width, and a distal hole section coaxial with the proximal section and located further away from the surface, the distal section having a second width larger than the first width, wherein the fragile part is a ceramic part; and
    an expandable bolt device inserted into the hole, the expandable bolt device comprising a bolt and a locking device near a distal end of the bolt, the locking device being radially movable between an outer locked position and an inner unlocked position by moving the bolt in an axial direction with respect to the locking device such that in the unlocked position a width of the locking device is smaller than the first width and in the locked position the width of the locking device within the distal hole is greater than the first width and is less than the second width.

13. The apparatus of claim 12, wherein the ceramic part is a quartz part.

14. A expandable bolt device, comprising:
a thread bolt having a proximal end and a distal end having a flared head, wherein the flared head has a spherical shape;
a retainer ring surrounding the threaded bolt near the distal end; and
a locking device positioned at least in part between the retainer ring and the flared head, the locking device configured to pivot outwardly when urged toward the flared head.

15. An expandable bolt device, comprising:
a threaded bolt having a proximal end and a distal end having a flared head;
a retainer ring surrounding the threaded bolt near the distal end; and
a locking device positioned at least in part between the retainer ring and the flared head, the locking device configured to pivot outwardly when urged toward the flared head,
wherein the retainer ring has a C-shaped cross-section, the retainer ring trapping an inner portion of the locking device against the threaded bolt, an outer portion of the locking device protruding on a distal side from the retainer ring.

16. The expandable bolt device of claim 15, wherein the flared head has a conical shape.

17. The expandable bolt device of claim 15, wherein the outer portion of the locking device engages with a distal surface of the retainer ring to limit outward movement of the locking device.

18. The expandable bolt device of claim 15, wherein the locking device comprises a plurality of locking elements distributed circumferentially about the bolt.

19. An expandable bolt device in combination with a ceramic part having a hole in a surface of a part, comprising:
a threaded bolt having a proximal end and a distal end having a flared head;
a retainer ring surrounding the threaded bolt near the distal end; and
a locking device positioned at least in part between the retainer ring and the flared head, the locking device configured to pivot outwardly when urged toward the flared head,
the hole of the ceramic part having a first section and a second section further from the surface than the first section, the second section being coaxial with, contiguous with and wider than the first section, the expandable bolt device inserted with the locking device in the second section of the hole, the locking device in a locked position having a width greater than the first width and less than the second width.

20. A method for mounting a fragile part to a second part, comprising:
providing a cylindrical hole in a surface of the fragile part, the hole having a first section adjacent to the surface, and a second section located further away from the surface, the first section having a first width and the second section having a second width larger than the first width;
providing an expandable bolt device, the expandable bolt device comprising a shaft and a radially movable locking element proximate a distal end of the shaft;
inserting the distal end of the expandable bolt device into the hole;
axially moving the shaft with respect to the locking element to cause outward radial movement of the locking element within the second section of the hole; and
limiting outward movement of the locking element to a width less than the second width, wherein limiting outward movement comprises contacting the locking element with a retainer ring around the shaft.

21. The method of claim 20, wherein axially moving the shaft causes the locking element to pivot.

22. The method of claim 21, wherein axially moving the shaft urges the locking element against a flared head at the distal end of the expandable bolt device.

23. The method of claim 20, further comprising fixing a proximal end of the expandable bolt device to the second part.

24. The method of claim 23, wherein fixing the proximal end comprises inserting the proximal end into a hole in the second part and threading a nut over the proximal end after inserting the proximal end.

25. The method of claim 20, wherein axially moving the shaft comprises tightening a nut over a threaded portion of the shaft.

26. A method for mounting a fragile part to a second part, comprising:
providing a cylindrical hole in a surface of the fragile part, the hole having a first section adjacent to the surface, and a second section located further away from the surface, the first section having a first width and the second section having a second width larger than the first width;
providing an expandable bolt device, the expandable bolt device comprising a shaft and a radially movable locking element proximate a distal end of the shaft;
inserting the distal end of the expandable bolt device into the hole;
axially moving the shaft with respect to the locking element to cause outward radial movement of the locking element within the second section of the hole;
fixing a proximal end of the expandable bolt device to the second part, wherein fixing the proximal end comprises inserting the proximal end into a hole in the second part and threading a nut over the proximal end after inserting the proximal end; and
providing a spring on a distal side of the nut, the spring urging the expandable bolt device outwardly from the hole.

27. The method of claim 26, wherein the spring is positioned between the nut and a proximal surface of the second part.

28. The method of claim 27, wherein at least one washer is positioned between the nut and the spring.

29. The method of claim 26, wherein the spring urges the locking element into engagement with a flange of the fragile part, the flange forming a chamfer between the first section and the second section of the hole.

* * * * *